United States Patent
Smith et al.

(10) Patent No.: US 10,674,313 B2
(45) Date of Patent: Jun. 2, 2020

(54) AUTOMATIC OPTIMIZATION PROCEDURE TERMINATION USING A SMOOTHING-BASED TECHNIQUE

(71) Applicant: Viavi Solutions UK Limited, Berkshire (GB)

(72) Inventors: Gareth James Smith, Berkshire (GB); Stefan Ulrich Thiel, Berkshire (GB); Christopher Michael Murphy, Bath (GB)

(73) Assignee: VIAVI Solutions UK Limited, Berkshire (GB)

( * ) Notice: Subject to any disclaimer, the term of this patent is extended or adjusted under 35 U.S.C. 154(b) by 683 days.

(21) Appl. No.: 15/073,247

(22) Filed: Mar. 17, 2016

(65) Prior Publication Data

US 2017/0272910 A1    Sep. 21, 2017

(51) Int. Cl.
| | |
|---|---|
| *H04W 4/02* | (2018.01) |
| *G06Q 10/00* | (2012.01) |
| *G06Q 10/04* | (2012.01) |
| *H04W 4/021* | (2018.01) |

(52) U.S. Cl.
CPC ............ *H04W 4/025* (2013.01); *G06Q 10/00* (2013.01); *G06Q 10/047* (2013.01); *H04W 4/021* (2013.01)

(58) Field of Classification Search
CPC ..... G06Q 10/00; G06Q 10/047; H04W 4/021; H04W 4/025
See application file for complete search history.

(56) References Cited

U.S. PATENT DOCUMENTS

| | | | | |
|---|---|---|---|---|
| 9,390,211 | B1* | 7/2016 | Henrickson | G06F 17/5072 |
| 2002/0150048 | A1* | 10/2002 | Ha | H04L 1/1887 |
| | | | | 370/231 |
| 2006/0072802 | A1* | 4/2006 | Higgs | G06T 7/12 |
| | | | | 382/131 |
| 2009/0247847 | A1* | 10/2009 | Pogue | A61B 5/0073 |
| | | | | 600/323 |
| 2010/0070498 | A1 | 3/2010 | Zhang et al. | |
| 2012/0100857 | A1* | 4/2012 | Belschner | H04W 36/0085 |
| | | | | 455/436 |

(Continued)

FOREIGN PATENT DOCUMENTS

WO    WO 0171455    9/2001

OTHER PUBLICATIONS

Hurley, "Automatic Base Station Selection and Configuration in Mobile Networks", Sep. 24-28, 2000, Vehicular Technology Conference Fall 2000. IEEE VTS Fall VTC2000. 52nd Vehicular Technology Conference, pp. 2585-2592 (Year: 2000).*

(Continued)

*Primary Examiner* — Kamran Afshar
*Assistant Examiner* — Brent Johnston Hoover
(74) *Attorney, Agent, or Firm* — Harrity & Harrity, LLP (57) ABSTRACT

A device may perform an iteration of an optimization procedure. The device may apply a smoothing technique to a value relating to the optimization procedure after performing the iteration of the optimization procedure. The device may selectively terminate the optimization procedure based on applying the smoothing technique to the value relating to the optimization procedure. The device may provide information identifying a result of the optimization procedure based on selectively terminating the optimization procedure.

20 Claims, 7 Drawing Sheets

(56) References Cited

U.S. PATENT DOCUMENTS

| | | | | |
|---|---|---|---|---|
| 2012/0183209 A1* | 7/2012 | Ryu | ...................... | G06T 11/001 382/162 |
| 2013/0053056 A1* | 2/2013 | Aggarwal | ............. | G01S 5/0263 455/456.1 |
| 2013/0184545 A1* | 7/2013 | Blomqvist | ......... | A61N 1/36521 600/325 |
| 2014/0358603 A1* | 12/2014 | Viger | ..................... | G06Q 10/08 705/7.12 |
| 2015/0120223 A1 | 4/2015 | Dannecker et al. | | |
| 2015/0237595 A1 | 8/2015 | Le et al. | | |
| 2016/0007130 A1* | 1/2016 | Germain | .................. | H04R 3/00 381/58 |
| 2017/0262992 A1* | 9/2017 | Bourmaud | .............. | G06T 7/285 |

OTHER PUBLICATIONS

Zielinski et al., "Stopping Criteria for a Constrained Single-Objective Particle Swarm Optimization Algorithm", Institute for Electromagnetic Theory and Microelectronics, University of Bremen, Germany, Informatica 31 (2007) 51-59, Nov. 3, 2006, 10 pages Co-pending U.S. Appl. No. 14/972,934, filed Dec. 17, 2015 entitled "Determining Mobile Device Location Based on a Particle Swarm Approach", Smith et al., 63 pages.

Extended European Search Report for European Application No. 17161279.9; dated Jul. 4, 2017, 8 pages.

Anonymous, "Heuristic (Computer Science)—Wikipedia", Feb. 23, 2016, 4 pages, XP055609888, [Retrieved on Jul. 30, 2019] Retrieved from the Internet [URL: https://en.wikipedia.org/w/index.php?title=Heuristic_(computer_science)&oldid=706418320].

Anonymous, "Smoothing—Wikipedia", Oct. 22, 2015, 3 pages, XP055609885, [Retrieved on Jul. 30, 2019] Retrieved from the Internet [URL: https://en.wikipedia.org/w/index.php?title=Smoothing&oldid=686978577].

Anonymous, "Network Performance—Wikipedia", Feb. 29, 2016, 5 pages, XP055609887, [Retrieved on Jul. 30, 2019] Retrieved from the Internet [URL: https://en.wikipedia.org/w/index.php?title=Network_performance&oldid=707526199].

Anonymous, "Swarm Intelligence—Wikipedia", Feb. 24, 2016, 14 pages, XP055609886, [Retrieved on Jul. 30, 2019] Retrieved from the Internet [URL: https://en.wikipedia.org/w/index.php?title=Swarm_intelligence&oldid=706664018].

Jwo D.J., et al., "Particle Swarm Optimization for GPS navigation Kalman Filter Adaptation", Aircraft Engineering and Aerospace Technology, Jul. 3, 2009, vol. 81 (4), pp. 343-352, XP055609881.

* cited by examiner

AUTOMATIC OPTIMIZATION PROCEDURE TERMINATION USING A SMOOTHING-BASED TECHNIQUE

BACKGROUND

A device may optimize a set of parameters to determine information. For example, the device may utilize an optimization technique to determine an approximate location of a mobile device during a call based on data relating to the call. In another example, the device may utilize an optimization technique to determine a solution to a traveling salesman problem, to optimize a mobile network, or the like. The device may perform multiple iterations of an optimization procedure to optimize the set of parameters based on the optimization technique. For example, the device may generate, for each iteration, a set of parameters, and may store information identifying the best set of parameters identified during the optimization procedure. After a particular quantity of iterations, the device may terminate the optimization procedure, and may utilize the best set of parameters as output of the optimization procedure. For example, the device may provide information identifying the approximate location of the mobile device based on the best set of parameters.

SUMMARY

According to some possible implementations, a device may include one or more processors. The one or more processors may perform an iteration of an optimization procedure. The one or more processors may apply a smoothing technique to a value relating to the optimization procedure after performing the iteration of the optimization procedure. The one or more processors may selectively terminate the optimization procedure based on applying the smoothing technique to the value relating to the optimization procedure. The one or more processors may provide information identifying a result of the optimization procedure based on selectively terminating the optimization procedure.

According to some possible implementations, a non-transitory computer-readable medium may store one or more instructions that, when executed by one or more processors, may cause the one or more processors to identify an optimization problem on which an optimization procedure is to be performed. The one or more instructions, when executed by the one or more processors, may cause the one or more processors to perform a calibration procedure to identify a set of convergence criteria relating to terminating the optimization problem. The calibration procedure may include another optimization procedure. The one or more instructions, when executed by the one or more processors, may cause the one or more processors to perform a set of iterations of the optimization procedure for the optimization problem after performing the calibration procedure. The one or more instructions, when executed by the one or more processors, may cause the one or more processors to determine, based on a smoothed rate of change of a best parameterization value of the optimization problem, that the set of convergence criteria is satisfied. The one or more instructions, when executed by the one or more processors, may cause the one or more processors to terminate the optimization procedure based on determining that the set of convergence criteria is satisfied.

According to some possible implementations, a method may include determining, by a device, a value relating to an iteration of an optimization procedure. The method may include comparing, by the device, the value to one or more other values relating to one or more other iterations of the optimization procedure. A smoothing technique may be applied to a result of comparing the value to the one or more other values. The method may include terminating, by the device, the optimization procedure based on a result of the smoothing technique being applied to the result of comparing the value to the one or more other values.

DETAILED DESCRIPTION

The following detailed description of example implementations refers to the accompanying drawings. The same reference numbers in different drawings may identify the same or similar elements.

A server device may utilize an optimization technique to optimize a set of parameters (e.g., a set of values) for an optimization problem. For example, the server device may utilize an optimization technique to identify a path with a minimum path length for a traveling salesman optimization problem. Similarly, the server device may utilize an optimization technique to select a set of network configuration parameters for obtaining a maximum achievable network performance. The server device may select a particular optimization technique, such as a particle swarm optimization technique, a genetic algorithm optimization technique, a hill climber optimization technique, a simulated annealing optimization technique, a tabu search optimization technique, a random search technique, or the like, and may utilize the particular optimization technique to select sets of parameters for the optimization problem.

The server device may generate a parameterization value for an iteration of an optimization procedure utilizing the optimization technique. The parameterization value may refer to a scalar representation (e.g., a scalar value) of the set of parameters selected for the iteration. For example, when performing the traveling salesman optimization problem, the server device may generate a parameterization value associated with representing a path length for a particular path. The server device may compare parameterization values for multiple iterations (e.g., a parameterization value of a current iteration with a previous best parameterization value associated with a previous iteration) and may select a best parameterization value (e.g., a current best parameterization value). For example, the server device may identify a maximum parameterization value for a set of multiple iterations, a minimum parameterization value for a set of multiple iterations, or the like.

The server device may intend to terminate the optimization procedure after obtaining a best possible parameterization value (e.g., a parameterization value representing a set of parameters that is optimal for the optimization problem). For example, when performing the traveling salesman optimization problem, the server device may intend to terminate the optimization procedure after identifying a path with a minimum path length. Similarly, when performing the network configuration optimization problem, the server device may intend to terminate after obtaining a set of parameters that result in the best possible network performance (e.g., a highest achievable throughput level, a highest achievable reliability level, or a lowest achievable bit error rate). However, based on the server device lacking information identifying the optimal set of parameters (e.g., the minimum path length or the highest achievable throughput level), the server device cannot determine whether a particular set of parameters associated with a particular iteration is the optimal set of parameters.

Based on the lack of information regarding the optimal set of parameters, the server device may attempt to obtain a sufficiently good set of parameters (e.g., perform a sufficiently good optimization to generate a sufficiently good parameterization value). For example, the server device may attempt to obtain a sufficiently short minimum path length or a sufficiently high throughput level. A set of parameters may be termed sufficiently good based on a trade-off between optimization and processing for the particular optimization being solved.

For example, the server device may perform an optimization problem with lower parameterization values being more optimal, and may obtain a first parameterization value of 95 out of 100 after 8 iterations, a second parameterization value of 10 out of 100 after 16 iterations, and a third parameterization value of 9 out of 100 after 10,000 iterations. In this case, terminating the optimization procedure after obtaining the first parameterization value may be termed a failure to achieve a sufficiently good set of parameters, as a reduction of 84 out of 100 is possible with a relatively small quantity of additional iterations (e.g., 8 additional iterations). Similarly, terminating the optimization procedure after obtaining the third parameterization value may be termed performing excessive optimization, as a reduction of only 1 out of 100 is achieved from a relatively large quantity of additional iterations (e.g., an additional 9,984 iterations). In contrast, terminating the optimization procedure after obtaining the second parameterization value may be termed a sufficiently good optimization and the second parameterization value may be termed a sufficiently good parameterization value.

The server device may utilize a stopping criterion to determine whether to terminate the optimization procedure (e.g., to determine whether the optimization procedure has produced a sufficiently good optimization). A stopping criterion may refer to a triggering event for terminating the optimization procedure. For example, the server device may terminate the optimization procedure after performing an iteration of the optimization procedure for each possible set of parameters. In this case, the server device may determine a path length associated with every possible path to identify the particular path with the minimum path length. Similarly, the server device may identify each possible permutation of network parameters, and may determine a throughput level associated with each permutation. However, some optimization problems may include excessive quantities of permutations of parameters resulting in excessive utilization of processing resources, or may utilize continuous parameters that cannot be quantized into a particular quantity of iterations.

Alternatively, the server device may terminate the optimization procedure after a particular threshold quantity of iterations. For example, the server device may terminate the optimization procedure after performing 10 iterations. However, the server device may satisfy the particular threshold and terminate the optimization procedure prior to achieving a sufficiently good parameterization value (e.g., resulting in less accurate output than is desired). Similarly, the server device may terminate the optimization procedure after performing 10,000 iterations. However, the server device may obtain a sufficiently good parameterization value before satisfying the particular threshold, causing the server device to perform excessive optimization (e.g., resulting in excessive utilization of processing resources).

Alternatively, the server device may terminate after failing to obtain an improved parameterization value for a threshold quantity of iterations. For example, the server device may store a best parameterization value (e.g., a lowest parameterization value obtained during previous iterations of the optimization procedure), may determine that a subsequent set of parameterization values is less optimal (e.g., greater or lesser) than the best parameterization value. In this case, the server device may terminate the optimization procedure after a threshold quantity of iterations without obtaining a new best parameterization value. However, this technique fails to account for previous changes to the best parameterization value resulting in the server device terminating the optimization procedure prior to obtaining a sufficiently good optimization or terminating after excessive optimization.

Implementations, described herein, may utilize a smoothing-based technique when determining whether to terminate an optimization procedure. For example, after a relatively large improvement to the best parameterization value, the server may require relatively more iterations of the optimization procedure without further improvement to the best parameterization value before triggering termination of the optimization procedure. In contrast, after a relatively small improvement to the best parameterization value, the server device may require relatively fewer iterations of the optimization procedure without improvement to the best parameterization value before triggering termination of the optimization procedure.

In this way, a likelihood of terminating an optimization procedure prior to identifying a set of parameters that are sufficiently good is reduced relative to other stopping criteria, thereby improving accuracy or suitability of an output of the optimization procedure. Moreover, a likelihood of performing excessive optimization is reduced relative to other stopping criteria, thereby reducing a utilization of processing resources for the optimization procedure. Furthermore, implementations, described herein, may utilize a calibration optimization procedure to identify a set of convergence criteria relating to termination of the optimization technique, thereby permitting the server device to automatically configure an optimization procedure. In this way, the server device reduces a utilization of computing resources and improves accuracy of configuration relative to requiring a manual configuration of the optimization procedure via multiple interactions with a user interface and/or multiple manual tests of optimization procedure configurations.

Figure 1A:
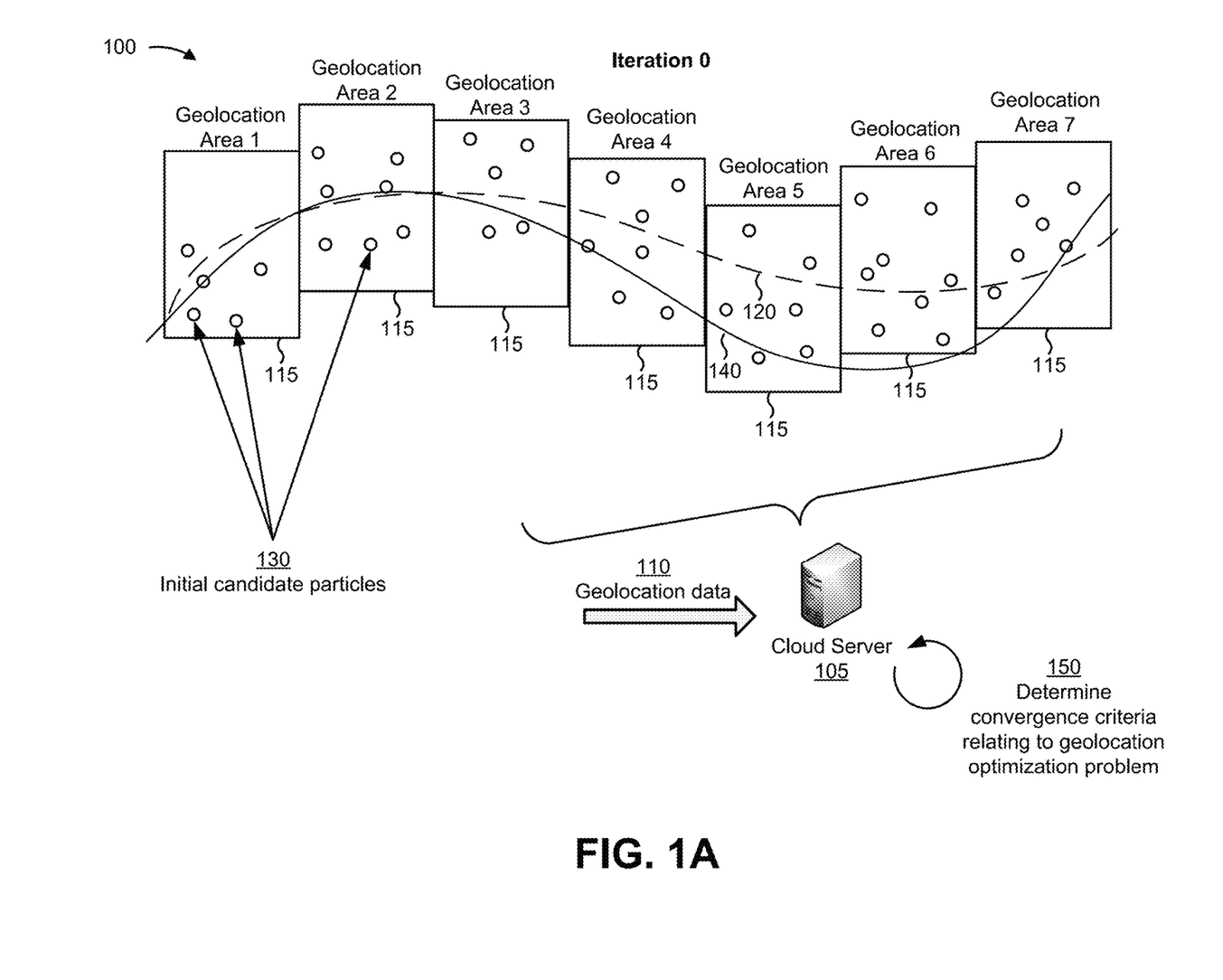
FIGS. 1A-1D are diagrams of an overview of an example implementation described herein.

FIGS. 1A-1D are diagrams of an overview of an example implementation 100 described herein. As shown in FIG. 1A, example implementation 100 may include a cloud server 105.

As further shown in FIG. 1A, and by reference number 110, cloud server 105 may receive data relating to an optimization problem (e.g., geolocation data relating to a geolocation optimization problem). For example, cloud server 105 may receive call data identifying a group of seven call segments corresponding to a group of seven geolocation areas 115 (e.g., Geolocation Area 1, Geolocation Area 2, Geolocation Area 3, Geolocation Area 4, Geolocation Area 5, Geolocation Area 6, and Geolocation Area 7). In this case, cloud server 105 may perform a particle swarm optimization procedure to determine a location of a user device (not shown) being moved through geolocation areas 115 along path 120 (e.g., a road) based on the call data. Cloud server 105 may generate sets of particles 130 for each geolocation area 115 based on the particle swarm optimization procedure, and may generate a trend line 140 for the sets of particles 130. In another example, cloud server 105 may receive call data identifying a group of call segments corresponding to a group of time intervals.

As shown by reference number 150, cloud server 105 may determine a set of convergence criteria relating to the geolocation optimization problem. The set of convergence criteria may refer to one or more criteria relating to determining that results of performing the optimization procedure have converged at a sufficiently good parameterization value. For example, cloud server 105 may receive information identifying a type of smoothing technique to apply to the parameterization values obtained at all or some subset of the optimization iterations so far completed of the particle swarm optimization procedure, such as an exponential smoothing technique, a double exponential smoothing technique, a loess smoothing technique, a Kalman filter technique, a high pass filter technique, a low pass filter technique, a curve fitting function technique, a least squares regression technique, a least squares regression technique, or the like. Additionally, or alternatively, cloud server 105 may receive information identifying one or more parameters for performing a particular smoothing technique, such as a set of smoothing constants for the double exponential smoothing technique. Additionally, cloud server 105 may receive information identifying one or more threshold criteria, such as a minimum quantity of iterations to perform, a maximum quantity of iterations to perform, a quantity of iterations for determining that a smoothed parameterization value has stabilized, a threshold deviation of the smoothed parameterization value (e.g., from some constant, such as zero or the like) for determining that the smoothed parameterization value has stabilized, or the like.

In another example, cloud server 105 may determine the set of convergence criteria automatically utilizing a calibration procedure. For example, cloud server 105 may perform a separate optimization procedure to optimize the set of convergence criteria for identifying a solution to the geolocation optimization problem. In this way, cloud server 105 automatically calibrates the optimization technique for the particular type of optimization problem.

Figure 1B:
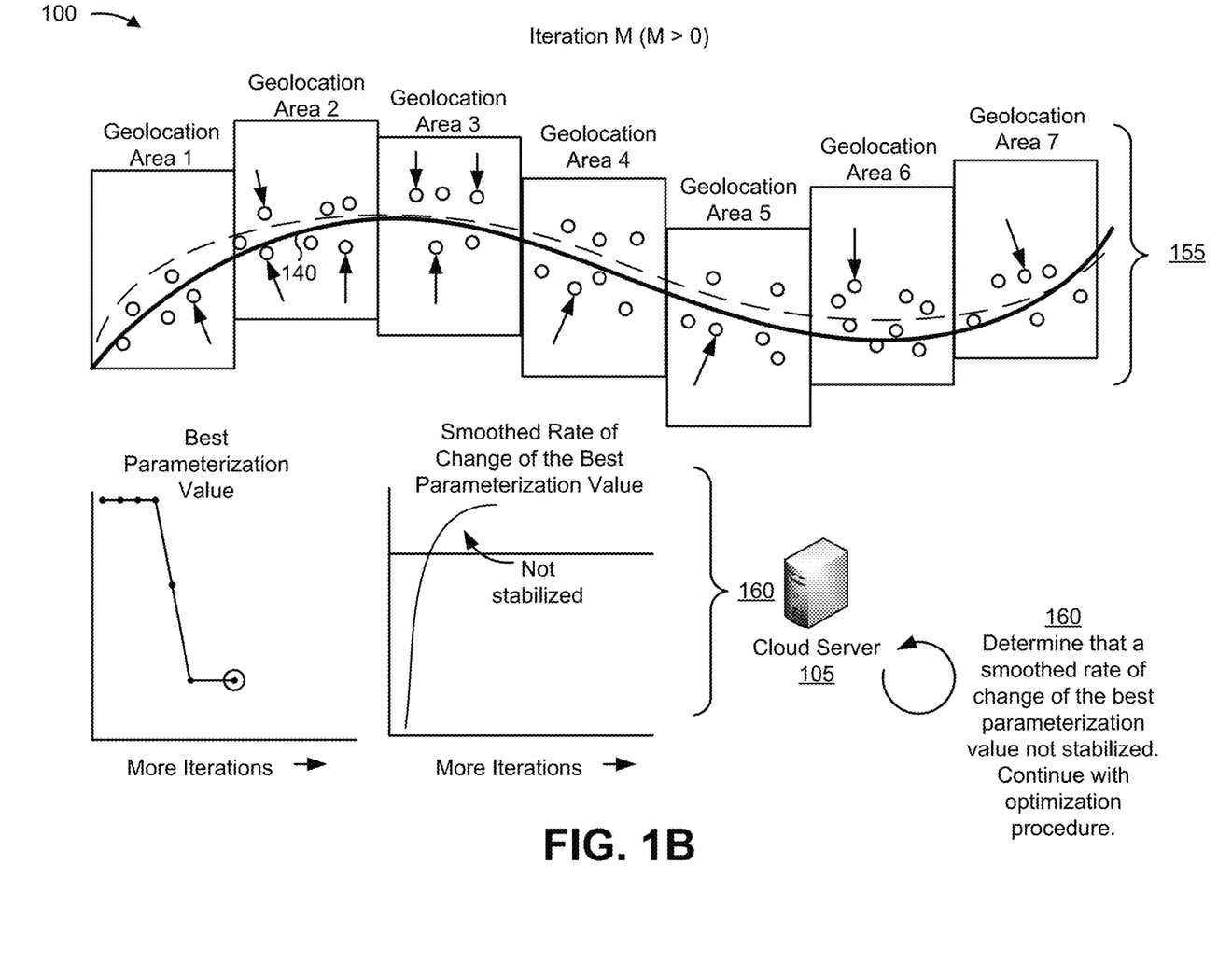

As shown in FIG. 1B, and by reference number 155, cloud server 105 may perform M iterations of the optimization procedure on the geolocation optimization problem. After each iteration, cloud server 105 may determine a parameterization value relating to various factors such as a position of trend line 140 (e.g., based on a score assigned to each of particles 130 as particles 130 are caused to move by the particle swarm optimization technique). Cloud server 105 may determine a best parameterization value based on the parameterization value of each iteration. For example, cloud server 105 may determine a parameterization value at iteration M and compare the parameterization value to one or more other parameterization values for one or more other iterations. In this case, cloud server 105 may select a minimum parameterization value as the best parameterization value. In another example, cloud server 105 may select a maximum parameterization value as the best parameterization value (e.g., for a maximum network coverage area optimization problem) Cloud server 105 may apply a smoothing technique (e.g., a double exponential smoothing technique) to the rate of change of the best parameterization value (e.g., at each optimization iteration) to obtain a smoothed rate of change of the best parameterization value.

As further shown in FIG. 1B, and by reference number 160, cloud server 105 may determine that the smoothed rate of change of the best parameterization value is not stabilized. For example, cloud server 105 may determine that the smoothed rate of change of the best parameterization value does not satisfy a threshold value (e.g., a threshold proximity to zero), satisfies the threshold value but for less than a threshold quantity of consecutive iterations, or the like. Based on determining that the smoothed rate of change of the best parameterization value is not stabilized, cloud server 105 may determine that the set of convergence criteria is not satisfied and may continue to perform the optimization procedure.

Figure 1C:
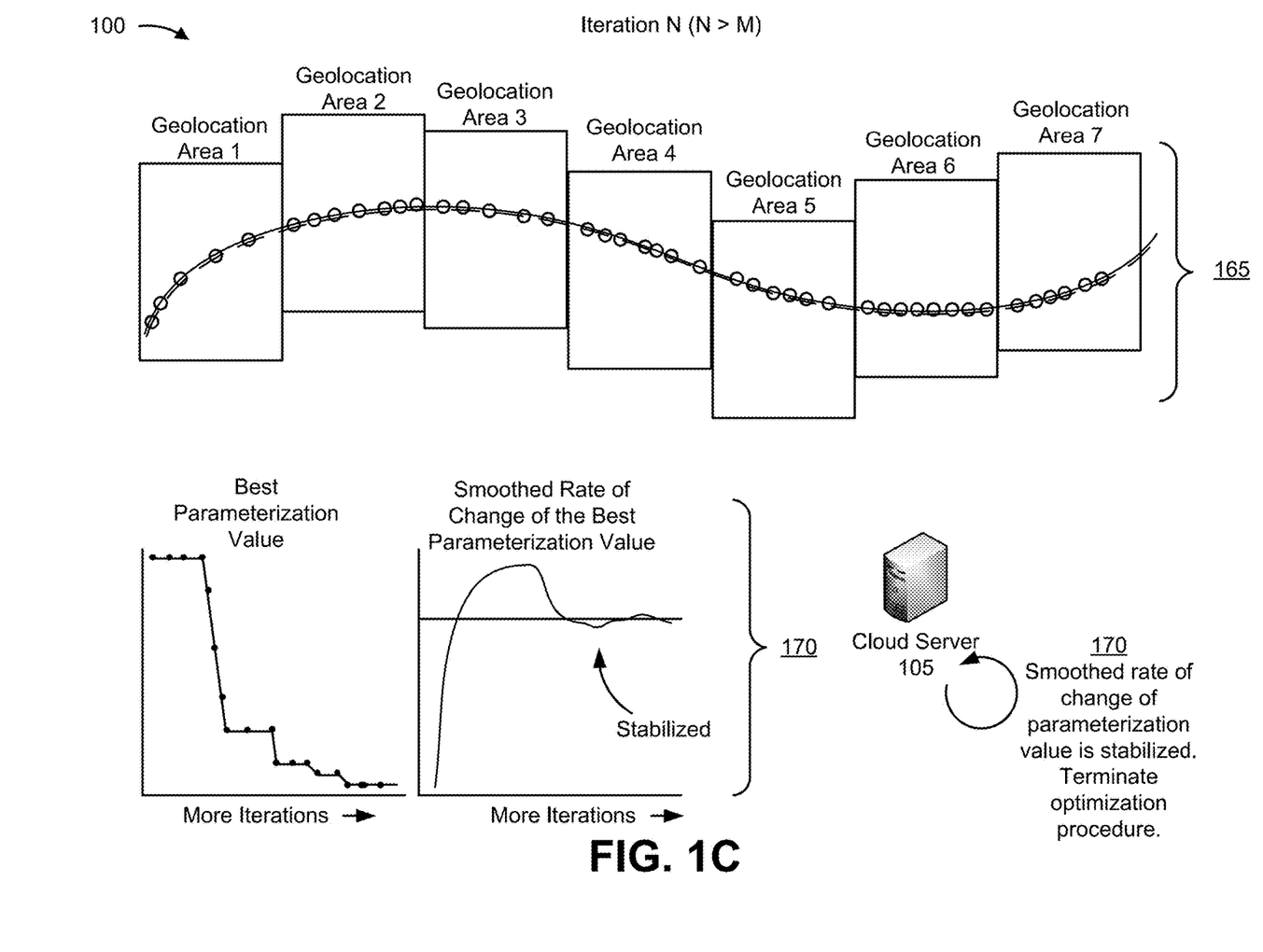

As shown in FIG. 1C, and by reference number 165, cloud server 105 may perform N iterations of the optimization procedure (N>M) on the geolocation optimization problem. Cloud server 105 may determine parameterization values for each iteration, and a best parameterization value based on the N iterations. Cloud server 105 may determine a smoothed rate of change of the best parameterization value (e.g., of each optimization iteration) based on the smoothing technique. As shown by reference number 170, cloud server 105 may determine that the parameterization value has stabilized, and may terminate the optimization procedure. For example, cloud server 105 may determine that the best parameterization value satisfies a threshold value (e.g., a threshold proximity to zero) for a threshold quantity of consecutive iterations. In this case, based on the set of convergence criteria being satisfied, cloud server 105 may terminate the optimization procedure.

Figure 1D:
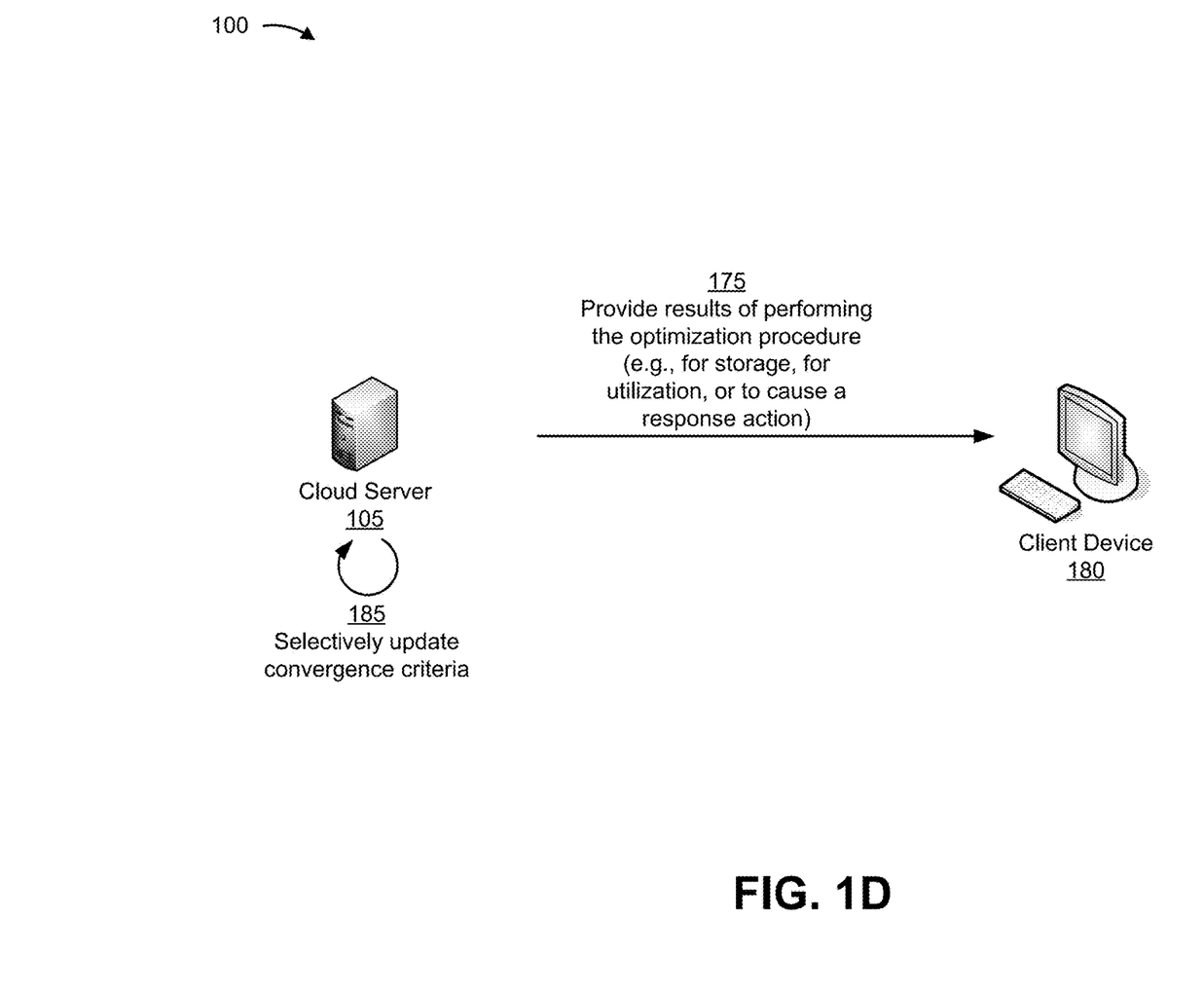

As shown in FIG. 1D, and by reference number 175, cloud server 105 may provide results of performing the optimization procedure to client device 180. For example, cloud server 105 may provide information identifying a set of locations of geolocation areas 115 at which the user device was located (e.g., within a particular proximity of path 120). In another example, cloud server 105 may cause the results to be stored (e.g., via cloud server 105, via client device 180, or via another data structure). In another example, cloud server 105 may cause a response action to be performed based on results of performing the optimization procedure. For example, based on determining the location of the user device, cloud server 105 may alter a configuration of a base station to improve network performance for the user device.

As shown by reference number 185, cloud server 105 may selectively update the set of convergence criteria. For example, cloud server 105 may determine that a threshold period of time has elapsed from performing the calibration procedure to determine the set of convergence criteria, and may determine to perform another calibration procedure. Similarly, cloud server 105 may determine that the quantity of iterations, N, satisfies a threshold, and may perform another calibration procedure based on the quantity of iterations satisfying the threshold. For example, cloud server 105 may determine that a utilization of processing resources associated with performing the optimization procedure for N satisfies a threshold, and may determine an updated set of convergence criteria to cause the optimization procedure to terminate with fewer iterations thereby reducing utilization of processing resources of future optimization procedures.

In another example, cloud server 105 may determine that an average quantity of iterations, Q, for a set of multiple optimization procedures satisfies a threshold, and may perform another calibration procedure based on the average quantity of iterations satisfying the threshold. In another example, cloud server 105 may determine that a quality of the parameterization value for the optimization procedure (or an average quality for multiple optimization procedures (e.g., an average improvement to an initial network configuration or a net improvement to an initial network configuration) satisfies a threshold, and may determine an updated set of convergence criteria to cause the optimization procedure to terminate with more iterations, fewer iterations, or the like thereby increasing the quality, decreasing the quality, or the like of the parameterization values of future optimization procedures.

In this way, cloud server 105 utilizes a smoothing-based stopping criterion (e.g., applies a smoothing technique to a best parameterization value at each iteration of an optimization procedure) to perform a determination of whether to terminate an optimization procedure, thereby permitting cloud server 105 to generate results of the optimization procedure with increased accuracy and/or with reduced utilization of processing resources relative to another stopping criterion.

As indicated above, FIGS. 1A-1D are provided merely as an example. Other examples are possible and may differ from what was described with regard to FIGS. 1A-1D.

Figure 2:
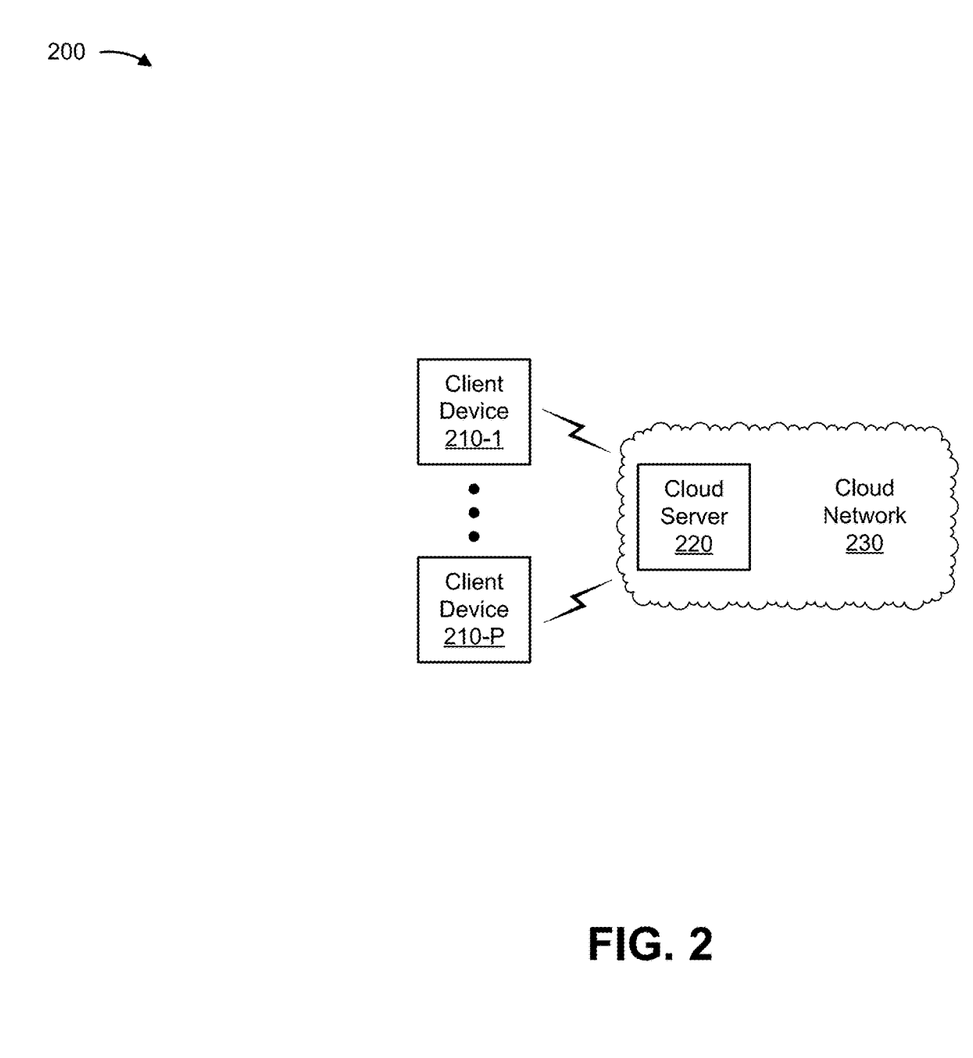
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-P (P≥1) (hereinafter referred to collectively as "client devices 210," and individually as "client device 210"), a cloud server 220, and a cloud network 230. Devices of environment 200 may interconnect via wired connections, wireless connections, or a combination of wired and wireless connections.

Client device 210 may include one or more devices capable of receiving, generating, storing, processing, and/or providing information associated with an optimization procedure. For example, client device 210 may include a communication and/or computing device, such as a mobile phone (e.g., a smart phone or a radiotelephone), a computer (e.g., a desktop computer, a laptop computer, a server device, a tablet computer, or a handheld computer), a gaming device, a wearable communication device (e.g., a smart wristwatch or a pair of smart eyeglasses), or a similar type of device. In some implementations, client device 210 may provide data to cloud server 220 to cause cloud server 220 to perform an optimization procedure. In some implementations, client device 210 may receive results of an optimization procedure, and may perform a response action based on the results of the optimization procedure. In some implementations, client device 210 corresponds to the user device and/or client device 180 of FIGS. 1A-1D. In some implementations, client device 210 may receive information from and/or transmit information to another device in environment 200.

Cloud server 220 includes one or more devices capable of storing, processing, and/or routing information associated with an optimization procedure. For example, cloud server 220 may include a server that performs a set of iterations of an optimization procedure on a data set to generate an optimized set of parameters. In some implementations, cloud server 220 may perform a particular type of optimization procedure. In some implementations, cloud server 220 may apply a particular type of smoothing technique to a parameterization value to determine whether to terminate the optimization procedure. In some implementations, cloud server 220 corresponds to cloud server 105 shown in FIGS. 1A-1D. In some implementations, cloud server 220 may include a communication interface that allows cloud server 220 to receive information from and/or transmit information to other devices in environment 200. While cloud server 220 will be described as a resource in a cloud computing network, such as cloud network 230, cloud server 220 may operate external to a cloud computing network, in some implementations.

Cloud network 230 includes an environment that delivers computing as a service, whereby shared resources, services, etc. may be provided by cloud server 220 to store, process, and/or route information associated with an optimization procedure. Cloud network 230 may provide computation, software, data access, storage, and/or other services that do not require end-user knowledge of a physical location and configuration of a system and/or a device that delivers the services (e.g., cloud server 220). As shown, cloud network 230 may include cloud server 220 and/or may communicate with client device 210 via one or more wired or wireless networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
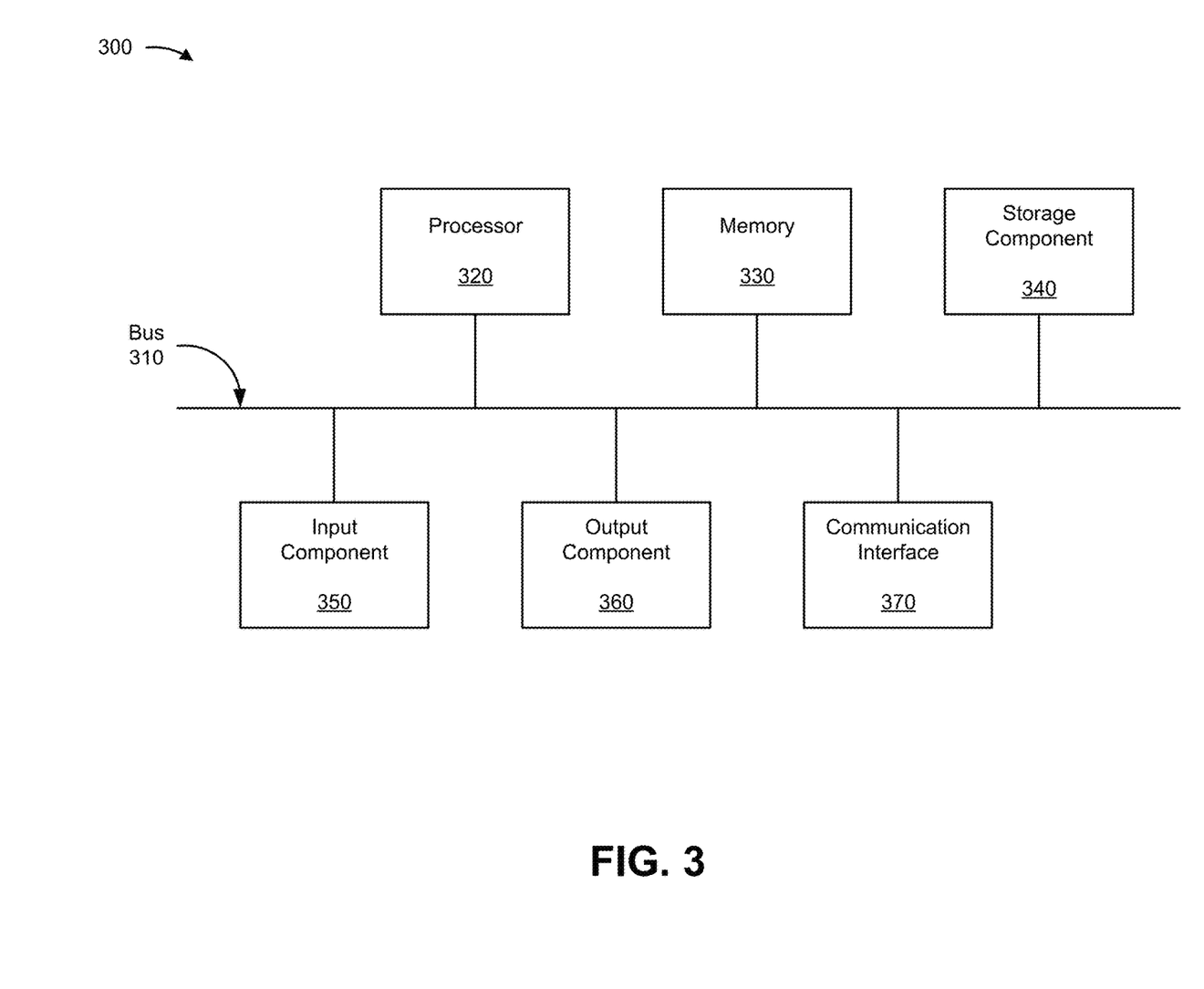
FIG. 3 is a diagram of example components of one or more devices of FIG. 2.

FIG. 3 is a diagram of example components of a device 300. Device 300 may correspond to client device 210 and/or cloud server 220. In some implementations, client device 210 and/or cloud server 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
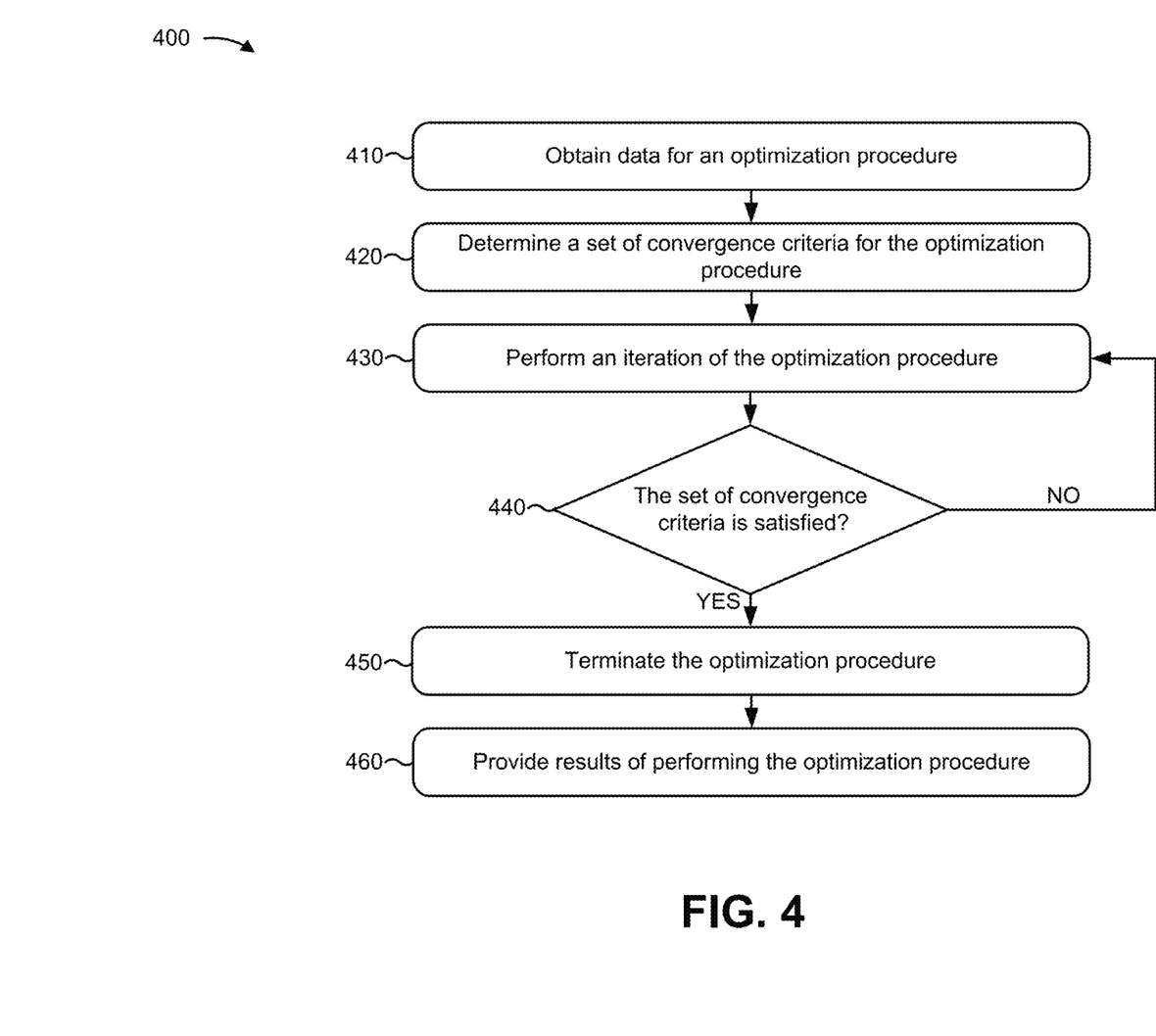
FIG. 4 is a flow chart of an example process for performing an optimization procedure utilizing a smoothing-based stopping criterion.

FIG. 4 is a flow chart of an example process 400 for performing an optimization procedure utilizing a smoothing-based stopping criterion. In some implementations, one or more process blocks of FIG. 4 may be performed by cloud server 220. In some implementations, one or more process blocks of FIG. 4 may be performed by another device or a group of devices separate from or including cloud server 220, such as client device 210 or the like.

As shown in FIG. 4, process 400 may include obtaining data for an optimization procedure (block 410). For example, cloud server 220 may obtain the data for the optimization procedure. In some implementations, cloud server 220 may obtain the data from client device 210. For example, when client device 210 collects data for an optimization problem (e.g., a geolocation optimization problem, a telecommunication optimization problem, a finance optimization problem, a weather forecasting optimization problem, or another optimization problem relating to another field), client device 210 may transmit the data to cloud server 220 to cause cloud server 220 to perform the optimization procedure for client device 210. In some implementations, cloud server 220 may obtain first data to perform an optimization procedure and second data to perform a calibration procedure. For example, cloud server 220 may receive a first subset of the data for a calibration procedure (e.g., a secondary optimization procedure to optimize the set of convergence criteria) and a second subset of data for an optimization procedure (e.g., a primary optimization procedure). In this case, cloud server 220 may utilize the optimized set of convergence criteria to perform the primary optimization procedure.

In some implementations, cloud server 220 may obtain a computational model or mathematical equation as an input. For example, cloud server 220 may receive data identifying the computational model and/or the mathematical equation, and may perform an optimization procedure to optimize the computational model and/or the mathematical equation.

In some implementations, cloud server 220 may obtain call data regarding a set of call segments. For example, with regard to performing a geolocation of a mobile device based on a particle swarm optimization technique, cloud server 220 may obtain, from the mobile device, information identifying a propagation delay value, a timing advance value, a round trip delay value, or the like. In some implementations, cloud server 220 may obtain configuration data regarding a set of parameters for configuring a network device. For example, with regard to performing an optimization of a set of network configuration parameters to improve network performance, cloud server 220 may obtain information identifying a transmit power, a common pilot channel (CPICH) power, a reference signal power, one or more mobility parameters regarding one or more cells, or the like.

As further shown in FIG. 4, process 400 may include determining a set of convergence criteria for the optimization procedure (block 420). For example, cloud server 220 may determine the set of convergence criteria for the optimization procedure. In some implementations, cloud server 220 may determine a type of smoothing technique that is to be applied based on the set of convergence criteria. Additionally, or alternatively, cloud server 220 may determine a parameter relating to applying the smoothing technique, a threshold relating to determining whether to terminate the optimization procedure, or the like.

In some implementations, cloud server 220 may receive information identifying the set of convergence criteria. For example, cloud server 220 may provide (e.g., via client device 210) a user interface with which to input one or more parameters for performing the optimization procedure, such as a set of constants for a smoothing technique or the like. Additionally, or alternatively, cloud server 220 may receive a selection of a particular type of smoothing function that is to be utilized, such as an exponential smoother, a double exponential smoother, a loess smoother, a Kalman filter, a high pass filter, a low pass filter, a curve fitting function, a least squares regress, or another type of smoother (e.g., another filter or curve fitting function).

Additionally, or alternatively, cloud server 220 may provide a simulated result of performing the optimization procedure based on inputs received via the user interface.

For example, when the optimization procedure is to be performed for a threshold quantity of optimization problems (e.g., 100 geolocations, 1,000 geolocations, or 10,000 geolocations), cloud server 220 may select one or more optimization problems, of the threshold quantity, on which to test the optimization procedure (e.g., execute the optimization procedure based on the inputs). In this case, cloud server 220 may receive an indication via the user interface that the inputs are to be utilized based on providing results of testing the optimization procedure, and cloud server 220 may perform the optimization procedure based on receiving the input.

Additionally, or alternatively, cloud server 220 may automatically determine the set of convergence criteria based on performing a calibration procedure (e.g., a secondary optimization). For example, cloud server 220 may select a subset of optimization problems (e.g., a relatively small subset, such as 5 or 10 optimization problems.) This calibration subset may be used for calibrating convergence criteria for another subset of optimization problems (e.g., a relatively large subset, such as 100 or 1,000 optimization problems). In this case, cloud server 220 may perform the optimization procedure for a threshold quantity of iterations (e.g., a relatively large quantity of iterations resulting in an excessive optimization and computation) on each member of the calibration subset to determine an expected best possible parameterization value for each member of the calibration subset of optimization problems that can be obtained without a threshold utilization of computing resources (e.g., after a relatively small quantity of iterations). Based on the expected best possible parameterization value and changes to the best parameterization value as iterations of the optimization procedure occurred, cloud server 220 may identify one or more parameters of the set of convergence criteria, such as one or more constants for a smoothing technique, one or more thresholds for a stopping criterion, or the like. Additionally, or alternatively, cloud server 220 may optimize the one or more constants based on an optimization procedure. In this way, cloud server 220 may select a set of convergence criteria that is associated with causing an optimization procedure (e.g., the primary optimization procedure) to terminate after obtaining a sufficiently good optimization and without performing an excessive optimization.

In some implementations, cloud server 220 may perform the calibration procedure periodically. For example, cloud server 220 may perform the calibration procedure to obtain a set of convergence criteria hourly, daily, or the like. Additionally, or alternatively, cloud server 220 may perform the calibration procedure based on a trigger. For example, cloud server 220 may determine that a set of convergence criteria have not been determined for a particular type of optimization problem. Additionally, or alternatively, cloud server 220 may determine that a particular utilization of an optimization procedure resulted in an average termination before a threshold quantity of iterations, after a threshold quantity of iterations, with an average parameterization value satisfying a threshold, or the like, thereby triggering cloud server 220 to update the set of convergence criteria. Additionally, or alternatively, cloud server 220 may update the set of convergence criteria based on a type of optimization procedure (e.g., being caused to change types of optimization procedures), a type of optimization problem (e.g., being caused to utilize a particular type of optimization procedure on a new type of optimization problem), a type of smoothing technique (e.g., being caused to change smoothing techniques), or the like.

In some implementations, cloud server 220 may obtain convergence criteria relating to performing the geolocation of the mobile device. For example, cloud server 220 may perform 10,000 optimization iterations of a first geolocation problem, may select convergence criteria associated with identifying a sufficiently good optimization, and may utilize the convergence criteria for performing 20,000 other optimizations for 20,000 second geolocation problems (e.g., each one including relatively fewer iterations of an optimization procedure, such as 100 iterations, based on the convergence criteria). Similarly, cloud server 220 may obtain convergence criteria relating to performing the network configuration optimization, such as by performing a relatively large quantity of iterations of a first network configuration optimization problem, and utilizing convergence criteria determined based on the first network configuration optimization problem for a second set of network configuration optimization problems.

As further shown in FIG. 4, process 400 may include performing an iteration of the optimization procedure (block 430). For example, cloud server 220 may perform the iteration of the optimization procedure. In some implementations, cloud server 220 may perform a single iteration of the optimization procedure prior to determining whether the set of convergence criteria is satisfied. For example, cloud server 220 may select a set of parameter values for the optimization problem based on the data and a particular type of optimization procedure. In some implementations, cloud server 220 may perform multiple iterations of the optimization procedure. For example, cloud server 220 may perform a particular quantity of iterations of the optimization procedure, and may select the best parameterization value from the particular quantity of iterations, for determining whether the set of convergence criteria is satisfied. In this way, cloud server 220 may reduce a utilization of processing resources relative to determining a smoothed rate of change of the parameterization value for each iteration.

In some implementations, cloud server 220 may store information identifying a best parameterization value at each iteration of the optimization procedure. For example, at a first iteration, cloud server 220 may determine a first parameterization value and may store the first parameterization value as the best parameterization value. Further to the example, at a second iteration, cloud server 220 may determine a second parameterization value that is less optimized than the first parameterization value, and cloud server 220 may continue to store the first parameterization value as the best parameterization value. Further to the example, at a third iteration, cloud server 220 may determine a third parameterization value that is more optimized than the first parameterization value, and cloud server 220 may replace the first parameterization value with the third parametrization value as the best parameterization value. In this case, cloud server 220 may store one or more parameters associated with the third parameterization value, and may provide the one or more parameters as results of performing the optimization procedure when the optimization procedure is terminated (e.g., as one or more optimized parameters).

As further shown in FIG. 4, process 400 may include determining whether the set of convergence criteria is satisfied (block 440). For example, cloud server 220 may determine whether the set of convergence criteria is satisfied. In some implementations, cloud server 220 may apply a smoothing procedure to determine whether the set of convergence criteria is satisfied. For example, cloud server 220 may apply the smoothing procedure to the best parameterization value at each iteration of the optimization procedure. In this case, with regard to a double exponential smoother, cloud server 220 may determine:

$$PotentialScore_i = SmoothedScore_{i-1} + RateOfScoreChange_{i-1}$$

where a score represents a best parameterization value at a current iteration i, $PotentialScore_i$ represents a potential best parameterization value for a current iteration i, $SmoothedScore_{i-1}$ represents a smoothed best parameterization value for a previous iteration i−1, and $RateOfScoreChange_{i-1}$ represents a smoothed rate of change of a smoothed best parameterization value for a previous iteration i−1. When $RateOfScoreChange_{i-1}$ has not been calculated (e.g., in a first iteration of the optimization procedure or when the best parameterization value has not yet changed for the optimization procedure), cloud server 220 may calculate $RateOfScoreChange_{i-1}$ as:

$$RateOfScoreChange_{i-1} = -(Score_{i-1}/K)$$

where $Score_{i-1}$ represents a non-smoothed best parameterization value of a previous iteration and K represents a constant value (e.g., 4). In this way, cloud server 220 determine a potential best parameterization value for the iteration based on a previous best parameterization value for a previous iteration.

Further to the example, cloud server 220 may determine:

$$SmoothedScore_i = \alpha * Score_i + (1-\alpha) * PotentialScore_i$$

where $SmoothedScore_i$ represents a smoothed best parameterization value for the current iteration i, α represents a constant value (e.g., ranging from 0 to 1 inclusive), and $Score_i$ represents a non-smoothed best parameterization value for the current iteration i. In this case, α may be selected when determining the convergence criteria (e.g., based on a calibration procedure), and may represent an extent to which the best parameterization value is smoothed. For example, an α value of 0.25 indicates that the smoothed best parameterization value for iteration i is 25% accounted for by the non-smoothed best parameterization value for iteration i and 75% by the potential best parameterization value for iteration i (e.g., 75% smoothing).

Further to the example, cloud server 220 may determine:

$$NewRateOfChange_i = SmoothedScore_i - SmoothedScore_{i-1}$$

where $NewRateOfChange_i$ represents a non-smoothed difference between smoothed best parameterization values for iteration i and iteration i−1, and cloud server 220 may determine:

$$RateOfScoreChange_i = \beta * NewRateOfChange_i + (1-\beta) * RateOfScoreChange_{i-1}$$

where β represents a constant value (e.g., ranging from 0 to 1 inclusive). In this case, β may be selected when determining the convergence criteria, and may represent an extent to which the smoothed rate of change of the best parameterization value is smoothed. For example, a β value of 0.25 indicates that the smoothed rate of change of the smoothed best parameterization value is 25% accounted for by the non-smoothed rate of change of the smoothed best parameterization value for current iteration i and 75% by the smoothed rate of change of the smoothed best parameterization value of a previous iteration i−1 (e.g., 75% smoothing). In this way, cloud server 220 performs double exponential smoothing on the rate of change of the best parameterization value (e.g., based on both the α and β values).

Further to the example, cloud server 220 determines whether the smoothed rate of change of the smoothed best parameterization value satisfies a threshold for a particular quantity of iterations. For example, cloud server 220 may include a counter, and may determine that the magnitude of $RateOfScoreChange_i$ is less than a particular value for a particular quantity of iterations (e.g., indicating that the parameterization value is stabilized), and may determine that the set of convergence criteria is satisfied. Based on performing the smoothing procedure, cloud server 220 may, after a relatively large change to the best parameterization value, trigger the stopping criteria (e.g., may determine that the set of convergence criteria is satisfied) after a relatively larger quantity of iterations without further change to the best parameterization value. Similarly, cloud server 220 may, after a relatively small change to the best parameterization value, trigger the stopping criteria after a relatively smaller quantity of iterations without further change to the best parameterization value. In this way, cloud server 220 ensures that the optimization procedure is not terminated prior to obtaining a sufficiently good optimization and does not continue for excessive optimization after obtaining the sufficiently good optimization.

Additionally, or alternatively, cloud server 220 may determine whether one or more threshold criteria of the set of convergence criteria are satisfied. For example, cloud server 220 may determine whether a quantity of iterations of the optimization procedure satisfies a minimum threshold quantity. In this case, when the minimum threshold quantity is not satisfied, cloud server 220 may determine that the set of convergence criteria is not satisfied and may perform another iteration of the optimization procedure. In this way, cloud server 220 reduces a likelihood that the optimization procedure terminates before identifying a good enough parameterization value (e.g., as a result of selecting relatively poor input parameters for performing the optimization procedure).

Similarly, cloud server 220 may determine whether a quantity of iterations of the optimization procedure satisfies a maximum threshold quantity. In this case, when the maximum threshold quantity is satisfied, cloud server 220 may determine that the set of convergence criteria is satisfied (regardless of the rate of change of the best parameterization value), and may terminate the optimization procedure. In this way, cloud server 220 reduces a likelihood that cloud server 220 utilizes excessive computation resource in performing the optimization procedure.

In some implementations, cloud server 220 may normalize one or more values when applying a smoothing technique. For example, cloud server 220 may divide $Score_i$ by another value (e.g., $Score_0$ representing a parameterization value for the first iteration of the optimization procedure) to cause the value of $Score_i$ or another value to be between 0 and 1 when comparing to a threshold. In this way, cloud server 220 may permit a single threshold to be utilized for multiple different optimization procedures, thereby reducing a utilization of computing resources relative to requiring calibration to be performed for a threshold criterion for each optimization procedure with a different magnitude Score value.

Although, implementations are described herein with regard to double exponential smoothing of a parameterization value, implementations, described herein, may also utilize other smoothing techniques, filtering techniques, or curve fitting techniques in association with the best parameterization value, a rate of change of the best parameterization value, or another value when determining whether to terminate the optimization procedure.

In some implementations, cloud server 220 may perform an iteration of an optimization technique for an optimization problem represented by multiple parameterization values that are optimized concurrently. For example, cloud server 220 may determine a first parameterization value and a second parameterization value for a particular iteration of the optimization technique, and may apply a smoothing technique to one or both of the first parameterization value and the second parameterization.

In some implementations, cloud server 220 may perform an iteration of an optimization technique to identify a set of parameters for the geolocation optimization problem. For example, when performing a particle swarm optimization technique, cloud server 220 may identify a position and a velocity of a set of particles at the iteration, and may determine a trend line for the set of particles. In this case, cloud server 220 may determine a parameterization value relating to various factors such as a position of the trend line, and may apply a smoothing technique to the parameterization value. Similarly, cloud server 220 may perform an iteration of the network configuration optimization to obtain a set of parameters (e.g., a transmit power, a CPICH power, or a reference signal power), may determine a parameterization value representing a simulated network performance based on the set of parameters, and may apply a smoothing technique to the parameterization values obtained at all or some subset of the optimization iterations so far completed.

As further shown in FIG. 4, if the set of convergence criteria is not satisfied (block 440—NO), process 400 may include performing another iteration of the optimization procedure (block 430). For example, cloud server 220 may perform another iteration of the optimization procedure, and may determine a parameterization value for the other iteration of the optimization procedure. In this case, cloud server 220 may determine whether the parameterization value for the other iteration of the optimization procedure alters the best parameterization value, and may determine whether the best parameterization value causes the set of convergence criteria to be satisfied.

As further shown in FIG. 4, if the set of convergence criteria is satisfied (block 440—YES), process 400 may include terminating the optimization procedure (block 450). For example, cloud server 220 may terminate the optimization procedure. In some implementations, cloud server 220 may store one or more parameter values relating to the optimization procedure based on terminating the optimization procedure. For example, cloud server 220 may store a set of parameter values relating to the best parameterization value for the optimization procedure.

In some implementations, cloud server 220 may determine that the set of convergence criteria relating to the geolocation optimization problem is satisfied. For example, cloud server 220 may determine that the absolute value of a smoothed rate of change of the parameterization value corresponding to the trend line is less than a threshold value for a threshold quantity of iterations. In this case, cloud server 220 may terminate the optimization procedure. In this way, cloud server 220 obtains a sufficiently good optimization without excessive optimization, thereby reducing computing resources utilized to acquire accurate estimates of the geolocation of the mobile device relative to another stopping criterion. Similarly, cloud server 220 may determine that the set of convergence criteria for the network configuration optimization problem is satisfied, and may terminate the optimization procedure. In this way, cloud server 220 obtains a sufficiently good optimization without excessive optimization, thereby reducing computing resources utilized to optimize the network configuration relative to utilizing another stopping criterion.

In some implementations, cloud server 220 may combine the first parameterization value and the second parameterization value, and may determine that the set of convergence criteria is satisfied for the combined parameterization value. Additionally, or alternatively, cloud server 220 may separately determine that the set of convergence criteria is satisfied for the first parameterization value and/or that the set of convergence criteria is satisfied for the second parameterization value, and may terminate the optimization problem based on determining that the set of convergence criteria is satisfied for one or more both of the first parameterization value and the second parameterization value.

As further shown in FIG. 4, process 400 may include providing results of performing the optimization procedure (block 460). For example, cloud server 220 may provide the results of performing the optimization procedure. In some implementations, cloud server 220 may provide the results to client device 210. For example, cloud server 220 may provide information identifying a set of parameters relating to the best parameterization value determined based on performing the optimization procedure. Additionally, or alternatively, cloud server 220 may provide the results for storage. For example, cloud server 220 may cause the set of parameter values to be stored for utilization at a subsequent time. In some implementations, cloud server 220 may perform a response action based on the results of the optimization procedure. For example, when cloud server 220 determines based on performing the optimization procedure that a user device is traveling along a path, cloud server 220 may alter a network parameter to improve network performance for the user device at a subsequent location of the path. Similarly, when performing the optimization procedure to select a set of convergence criteria for another optimization procedure, cloud server 220 may utilize the set of parameters as the set of convergence criteria, and may perform the other optimization procedure.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, cloud server 220 utilizes a smoothed stopping criterion (e.g., cloud server 220 applies a smoothing procedure to smooth a rate of change of a best parameterization value) for an optimization procedure, thereby permitting cloud server 220 to determine a set of parameters that is sufficiently optimized without excessive iterations of the optimization procedure. Moreover, cloud server 220 may automatically determine parameters of the smoothing procedure associated with obtaining the sufficiently optimized set of parameters based on performing a calibration procedure. Based on reducing a likelihood of performing excessive iterations of the optimization procedure, relative to another stopping criterion, cloud server 220 reduces utilization of computing resources. Moreover, based on reducing a likelihood of terminating the optimization procedure prior to obtaining a sufficiently optimized parameterization value, cloud server 220 improves computer-based automated optimization.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value (or an absolute value of the value) being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors configured to:
   determine that a threshold relating to a minimum quantity of iterations of an optimization procedure, for a network configuration problem, is not satisfied;
   perform an iteration of the optimization procedure based on determining that the threshold relating to the minimum quantity of iterations of the optimization procedure is not satisfied;
   apply a smoothing technique to a value relating to the optimization procedure after performing the iteration of the optimization procedure;
   selectively terminate the optimization procedure based on applying the smoothing technique to the value relating to the optimization procedure;
   determine, based on the optimization procedure, that a user device is traveling along a path; and
   alter, based on determining that the user device is traveling along the path, a network parameter in a manner that improves network performance for Hall the user device.

2. The device of claim 1,
where the optimization procedure is a primary optimization procedure;
where the one or more processors are further configured to:
   identify a set of convergence criteria relating to the primary optimization procedure; and
   perform a secondary optimization procedure to select an optimized set of convergence criteria based on identifying the set of convergence criteria; and
where the one or more processors, when selectively terminating the optimization procedure, are configured to:
   selectively terminate the optimization procedure based on the optimized set of convergence criteria.

3. The device of claim 1, where the one or more processors are further configured to:
select a particular type of optimization technique for the optimization procedure,
   the particular type of optimization technique including at least one of:
      a particle swarm optimization technique,
      a genetic algorithm optimization technique,
      a hill climber optimization technique,
      a simulated annealing optimization technique,
      a tabu search optimization technique, or
      a random search technique.

4. The device of claim 1, where the smoothing technique includes at least one of:
an exponential smoothing technique,
a double exponential smoothing technique,
a loess smoothing technique,
a Kalman filter technique,
a high pass filter technique,
a low pass filter technique,
a curve fitting function technique, or
a least squares regression technique.

5. The device of claim 1,
where the one or more processors are further configured to:
   determine, based on performing the iteration of the optimization procedure, a particular parameterization value for the iteration of the optimization procedure;

determine, based on the particular parameterization value and for the iteration of the optimization procedure, a parameterization value for the optimization procedure; and determine, based on the parameterization value and one or more other parameterization values relating to one or more other iterations of the optimization procedure, the value relating to the optimization procedure, the value being a rate of change of the parameterization value for the optimization procedure; and where the one or more processors, when selectively terminating the optimization procedure, are configured to:

determine that a smoothed rate of change of the parameterization value satisfies a set of convergence criteria; and terminate the optimization procedure based on determining that the smoothed rate of change of the parameterization value satisfies the set of convergence criteria.

6. The device of claim 1, where the one or more processors, when selectively terminating the optimization procedure, are configured to:

determine that the value fails to satisfy a set of convergence criteria based on applying the smoothing technique to the value, the value indicating that a rate of change of a parameterization value for the optimization procedure is not stabilized;

perform another iteration of the optimization procedure;

apply the smoothing technique to another value relating to the optimization procedure; and determine that the other value satisfies the set of convergence criteria based on applying the smoothing technique to the other value; and terminate the optimization procedure based on determining that the other value satisfies the set of convergence criteria.

7. The device of claim 1, where the one or more processors are further configured to:

perform another iteration of the optimization procedure, the other iteration occurring before the iteration of the optimization procedure;

determine, based on performing the other iteration, that a rate of change of a parameterization value is stabilized, the rate of change of the parameterization value being stabilized indicating that the optimization procedure is to terminate; and where the one or more processors, when determining that the threshold relating to the minimum quantity of iterations of the optimization procedure is not satisfied, are to:

determine, after determining that the rate of change of the parameterization value is stabilized, that flail the threshold relating to flail the minimum quantity of iterations of the optimization procedure is not satisfied.

8. The device of claim 1, where the one or more processors are further configured to:

determine, based on applying the smoothing technique to the value, that a rate of change of a parameterization value of the optimization procedure is not stabilized, the rate of change of the parameterization value being determined based on applying the smoothing technique to the value; and determine, after determining that the rate of change of the parameterization value of the optimization procedure is not stabilized, that a threshold relating to a maximum quantity of iterations of the optimization procedure is satisfied; and where the one or more processors, when selectively terminating the optimization procedure, are to:

terminate the optimization procedure based on determining that the threshold relating to the maximum quantity of iterations of the optimization procedure is satisfied.

9. A non-transitory computer-readable medium storing instructions, the instructions comprising:

one or more instructions that, when executed by one or more processors, cause the one or more processors to:

identify an optimization problem on which an optimization procedure is to be performed, the optimization problem being a network configuration optimization problem;

perform a calibration procedure to identify a set of convergence criteria relating to terminating the optimization problem, the calibration procedure including another optimization procedure;

determine that a threshold relating to a minimum quantity of iterations of an optimization procedure, for a network configuration problem, is not satisfied;

perform a set of iterations of the optimization procedure after performing the calibration procedure based on determining that the threshold relating to the minimum quantity of iterations of the optimization procedure is not satisfied;

determine, based on a smoothed rate of change of a parameterization value of the optimization problem, that the set of convergence criteria is satisfied;

terminate the optimization procedure based on determining that the set of convergence criteria is satisfied;

determine, based on the optimization procedure, that a user device is traveling along a path; and alter, based on determining that the user device is traveling along the path, a network parameter in a manner that improves network performance for flail the user device.

10. The non-transitory computer-readable medium of claim 9, where the one or more instructions, when executed by the one or more processors, further cause the one or more processors to:

determine, at a particular iteration of the set of iterations of the optimization procedure, a set of parameters for the optimization problem;

determine a particular parameterization value based on the set of parameters, the particular parameterization value being a scalar representation of the set of parameters;

compare the particular parameterization value to a previous parameterization value at another iteration immediately preceding the iteration to determine a current parameterization value at the iteration;

identify one or more other parameterization values determined at one or more other iterations of the optimization problem,
the one or more other parameterization values including the previous parameterization value;
determine a rate of change of the parameterization value based on the current parameterization value and the one or more other parameterization values; and
apply a smoothing technique to the rate of change of the parameterization value to generate the smoothed rate of change of the parameterization value.

11. The non-transitory computer-readable medium of claim 10,
where the one or more instructions, that cause the one or more processors to determine the particular parameterization value, further cause the one or more processors to:
apply the smoothing technique to the particular parameterization value to generate a smoothed parameterization value; and
where the one or more instructions, that cause the one or more processors to compare the particular parameterization value to the previous parameterization value, cause the one or more processors to:
compare the smoothed parameterization value to a smoothed previous parameterization value to determine a smoothed current parameterization value.

12. The non-transitory computer-readable medium of claim 9, where the one or more instructions, that cause the one or more processors to perform the calibration procedure, cause the one or more processors to:
perform a threshold quantity of iterations of the other optimization procedure,
the threshold quantity being greater than a quantity of iterations of the set of iterations;
identify a change to a parameterization value of the other optimization procedure based on performing the threshold quantity of iterations of the other optimization procedure; and
select the set of convergence criteria for the optimization problem based on the change to the parameterization value of the other optimization procedure,
the set of convergence criteria being selected to cause the quantity of iterations of the set of iterations to be less than the threshold quantity of iterations.

13. The non-transitory computer-readable medium of claim 9, where the one or more instructions, when executed by the one or more processors, further cause the one or more processors to:
provide information identifying a result of performing the optimization procedure based on terminating the optimization procedure.

14. The non-transitory computer-readable medium of claim 13, where the one or more instructions, that cause the one or more processors to provide the information identifying the result of performing the optimization procedure, cause the one or more processors to:
provide information identifying a set of parameters corresponding to the parameterization value of the optimization procedure.

15. The non-transitory computer-readable medium of claim 9, where the one or more instructions, when executed by the one or more processors, further cause the one or more processors to:
identify a set of parameters corresponding to the parameterization value of the optimization problem based on terminating the optimization problem,
the network parameter being altered based on the set of parameters.

16. A method, comprising:
determining, by a device, that a threshold relating to a minimum quantity of iterations of an optimization procedure, for a network configuration problem, is not satisfied;
determining, by the device, a value relating to an iteration of the optimization procedure based on determining that the threshold relating to the minimum quantity of iterations of the optimization procedure is not satisfied;
comparing, by the device, the value to one or more other values relating to one or more other iterations of the optimization procedure,
a smoothing technique being applied to a result of comparing the value to the one or more other values;
terminating, by the device, the optimization procedure based on a result of the smoothing technique being applied to the result of comparing the value to the one or more other values;
determining, by the device and based on the optimization procedure, that a user device is traveling along a path; and
altering, based on determining that the user device is traveling along the path, a configuration of a network parameter in a manner that improves network performance for the user device.

17. The method of claim 16, further comprising:
performing a calibration procedure to optimize a set of convergence criteria for the optimization procedure; and
determining that the result of comparing the value to the one or more other values satisfies the set of convergence criteria based on applying the smoothing technique to the result,
where terminating the optimization procedure comprises:
terminating the optimization procedure based on determining that the result of comparing the value to the one or more other values satisfies the set of convergence criteria.

18. The method of claim 16,
where comparing the value to the one or more other values comprises:
determining a rate of change for the value and the one or more other values; and
applying the smoothing technique to the rate of change to generate a smoothed rate of change; and
where terminating the optimization procedure comprises:
terminating the optimization procedure based on the smoothed rate of change.

19. The method of claim 16, where the value is a parameterization value relating to a set of parameters selected for the iteration of the optimization procedure.

20. The method of claim 16, further comprising:
providing a set of parameters based on terminating the optimization procedure,
the set of parameters being selected during the optimization procedure.

* * * * *

UNITED STATES PATENT AND TRADEMARK OFFICE
CERTIFICATE OF CORRECTION

PATENT NO. : 10,674,313 B2
APPLICATION NO. : 15/073247
DATED : June 2, 2020
INVENTOR(S) : Gareth James Smith et al.

Page 1 of 1

It is certified that error appears in the above-identified patent and that said Letters Patent is hereby corrected as shown below:

In the Claims

In Claim 1, Column 18, Line 22, "manner that improves network performance for Hall" should be changed to --manner that improves network performance for--;

In Claim 7, Column 19, Line 59, "flail the threshold relating to flail the minimum" should be changed to --the threshold relating to the minimum--;

In Claim 9, Column 20, Line 50, "manner that improves network performance for flail" should be changed to --manner that improves network performance for--.

Signed and Sealed this
Twenty-first Day of July, 2020

Andrei Iancu
*Director of the United States Patent and Trademark Office*